United States Patent
Holtorf et al.

(10) Patent No.: US 7,251,323 B2
(45) Date of Patent: Jul. 31, 2007

(54) BI-STABLE HINGE AND SYSTEMS USING SAME

(75) Inventors: Jim Holtorf, Newbury Park, CA (US); Michael McKay, Frederiksberg (DK); Ann Sullivan, Waltham, MA (US); Alexandre Hennen, Cambridge, MA (US); Tonia Giesecke, Cambridge, MA (US)

(73) Assignee: Nokia Corporation, Espoo (FI)

( * ) Notice: Subject to any disclaimer, the term of this patent is extended or adjusted under 35 U.S.C. 154(b) by 254 days.

(21) Appl. No.: 10/826,781

(22) Filed: Apr. 16, 2004

(65) Prior Publication Data

US 2004/0266502 A1    Dec. 30, 2004

Related U.S. Application Data

(60) Provisional application No. 60/463,488, filed on Apr. 17, 2003.

(51) Int. Cl.
*H04M 1/00* (2006.01)
*H01M 1/00* (2006.01)

(52) U.S. Cl. .............................. 379/433.13; 455/575.3

(58) Field of Classification Search .......... 379/433.13, 379/433.01, 433.1; 455/575.3
See application file for complete search history.

(56) References Cited

U.S. PATENT DOCUMENTS

| 4,847,818 | A | * | 7/1989 | Olsen ................... 379/433.1 |
| 6,217,975 | B1 | | 4/2001 | Daton-Lovett |
| 6,256,938 | B1 | | 7/2001 | Daton-Lovett |
| 6,431,271 | B1 | | 8/2002 | Thomeer et al. |

FOREIGN PATENT DOCUMENTS

| JP | 4-277958 | * 10/1992 | ............ 379/433.01 |
| JP | 04277958 A | 10/1992 | |

* cited by examiner

*Primary Examiner*—Rasha S. Al-Aubaidi
(74) *Attorney, Agent, or Firm*—Alston & Bird LLP (57) ABSTRACT

The present invention provides an improved hinge design for a mobile station or other electronic device that simplifies hinge assembly and thus, provides a more cost-effective manufactured product. Moreover, the improved hinge assembly complements the aesthetic appeal of the foldable mobile station and provides less stress on various internal elements. In particular, the present invention includes a foldable mobile station or other foldable electronic device having a first functional component that is coupled to a second functional component via a bi-stable structure. The bi-stable structure functions to bias the first and second functional components in either an open or closed position.

34 Claims, 11 Drawing Sheets

BI-STABLE HINGE AND SYSTEMS USING SAME

CROSS-REFERENCES TO RELATED APPLICATIONS

This application claims the benefit of U.S. provisional patent application Ser. No. 60/463,488, filed Apr. 17, 2003, which is fully incorporated herein by reference.

FIELD OF THE INVENTION

The present invention relates generally to mobile-stations, and more specifically to a mobile station having a folded design encompassing a bi-stable member.

BACKGROUND

The manufacture and design of today's mobile stations (also known as mobile phones, PDAs, pagers, laptop computers and the like) is constantly evolving. Early mobile station designs were necessarily large and bulky. The radio communications equipment and battery units necessary for their operation generally were carried in one oversized unit; although in at least one early and cumbersome design the unit was actually divided into two pieces which were then connected by a power cable. Advances in integrated circuitry and electricity storage technology have enabled mobile station designers to create smaller and smaller devices. These instruments are not only lighter, but also less cumbersome and easier to transport. For example, mobile stations are no longer required to be permanently installed in automobiles or connected to bulky separately-carried battery packs. Essentially, today's smaller, more useful mobile stations have simply become more fashionable.

Unfortunately, several drawbacks have followed this new fashionability and convenience. For example, the increased mobility of today's mobile stations has the unintended drawback of subjecting these mobile stations to an ever-increasing number of potentially damaging environments. For modern day consumers, these environments include pockets, briefcases, purses, gym bags, glove compartments and toolboxes where the mobile station can contact harmful solid objects and moisture that may cause structural and/or cosmetic damage to the relatively delicate internal and operational elements (e.g., LCD displays, microphone and speaker ports, keypads, etc.) of the mobile station. Accordingly, mobile stations are highly susceptible to damage. To make matters worse, market forces continue to drive mobile stations smaller, therefore, making it more difficult to add bulky structural reinforcements that might protect the mobile stations.

This risk of damage is exacerbated by the number of externally accessible components that are provided on modern mobile stations. One of the most prominent of these components is the visual display. Initially, such displays were limited to small, light emitting diodes (LEDs) that indicated whether the mobile station was "on" or, regarding mobile phones, whether a call was in progress. Gradually, more advanced LED displays were developed that were capable of displaying a dialed telephone number, the current time, or other simple information. More recently, liquid crystal displays (LCDs) have become commonplace. An LCD is made by sandwiching an electrically sensitive liquid-crystal material between two very thin pieces of glass or other transparent materials. They are, therefore, easily susceptible to damage by even a relatively minor impact. Despite the hard, transparent cover or similar protective device, generally added to limit this vulnerability, LCDs remain one of the most easily damaged components in modern mobile stations.

Figures 1A, 1B:
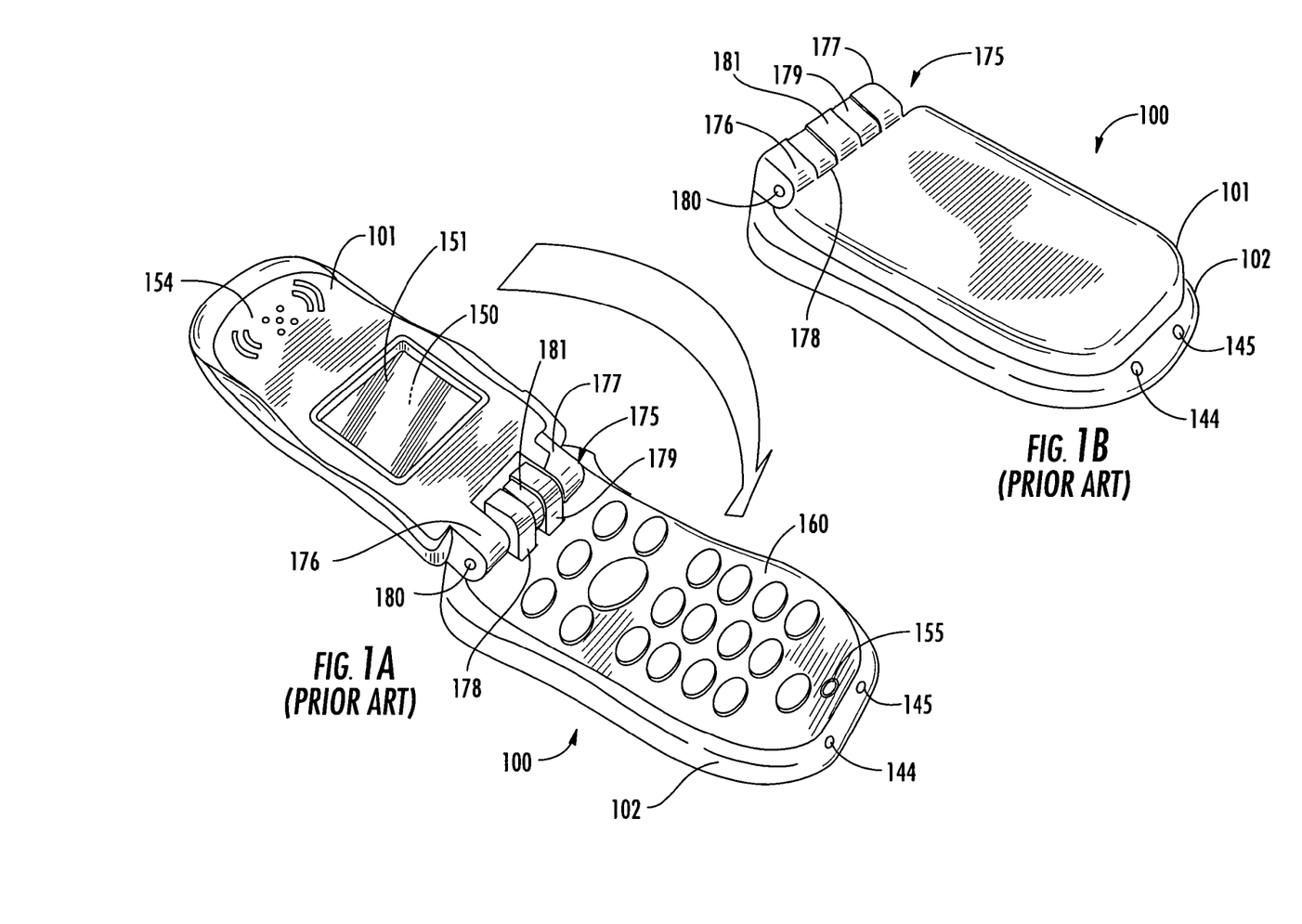
FIG. 1A is a perspective view of the mobile station in an open configuration.
FIG. 1B is a perspective view of the mobile station in a closed configuration.
Figure 1C:
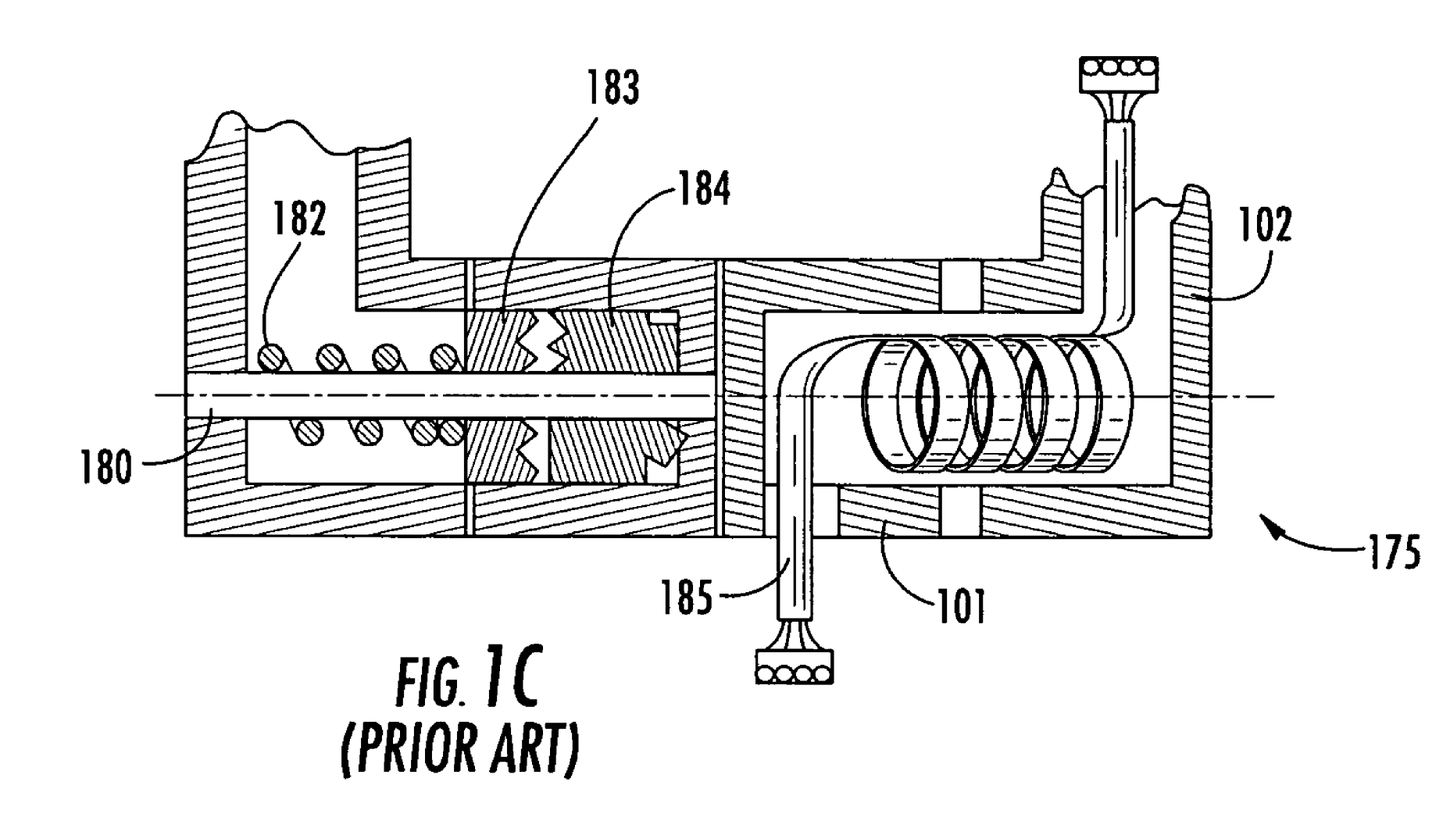
FIG. 1C is a section view of the conventional cylindrical hinge assembly depicted in FIGS. 1A and 1B according to the known prior art.

The folded mobile station design has developed, in part, to provide greater durability to modern mobile stations. As will become apparent, folded mobile stations also provide increased utility due to their relatively compact size. A folded mobile station is one that may be, generally speaking, folded from two parts into one more compact part. More specifically, as illustrated in FIGS. 1A-1C, folded mobile stations 100 are generally comprised of a first functional component 101 and a second functional component 102. The first and second functional components 101, 102 are mechanically coupled to one another by a hinge assembly 175 such that each may be folded over the other in a clam-shell type action. Accordingly, folded mobile stations 100 possess an "open" and a folded or "closed" position.

FIG. 1A provides one example of a conventional mobile station 100 (a mobile phone) oriented in the open position. As known to one of ordinary skill in the art, the first and second functional components 101, 102 of the mobile station 100 include various internal circuitry and operational elements. For example, the first functional component 101 is depicted as including a LCD 150. The LCD 150 is visible through, and protected by, a clear plastic cover 151. A speaker port 154 is comprised of a series of small openings formed in first portion 101, and lies adjacent to an internal speaker (not shown) that is also housed by the first portion 101. Further, the first portion 101 also typically includes circuitry for driving the LCD 150 and the internal speaker (not shown).

The second portion 102 of a conventional mobile station 100 generally includes a microphone port 155 that is adjacent to an internal microphone (not shown). A keypad 160 is also provided that is comprised of a series of keys extending through a plurality of openings from an otherwise internally disposed key mat. As with the first portion 101, the second portion 102 of mobile station 100 also houses the internal circuitry associated with the above described microphone 155 and keypad 160. An antenna for facilitating radio frequency (RF) communications (not shown) may be located in either the first portion 101 or the second portion 102, or may be distributed between them. Mobile station batteries (not shown) are typically stored in the second portion 102, due to the limited space available in the first portion 101 as a result of the LCD 150 and speaker 154 placement. An external power supply (not shown), such as an AC adaptor, may be connected through a power port 144. Similarly, external headphones (not shown) may be connected to the mobile station 100 at the external-device port 145.

When the mobile station is thus "opened," the user has access to the keypad 160 and can conveniently place the speaker port 154 and microphone port 155 in a position for voice communication. The mobile station 100 may also be "closed" by folding the first portion 101 to meet the second portion 102 in a clam-shell action as indicated by the arrow. FIG. 1B illustrates a known mobile station 100 in the closed position. Advantageously, the first portion 101 and the second portion 102 close in such a manner as to protect the keypad 160 and LCD 150. Generally speaking, known mobile stations 100 cannot be used in a closed configuration, although such functionality may be achieved by employing an external microphone and speaker (not shown). Such devices are often used in 'hands-free' operation, and are readily connected through an external-device port 145. As alluded to above, the folded design of modern mobile stations 100 distinguish them from their predecessors by accommodating safe storage on belts, in pockets, purses, or glove compartments without subjecting the sensitive internal components to damage from keys or other objects frequently encountered in such environments.

As should by now be apparent, folded mobile stations 100 possess features that are both useful and desirable to consumers. In addition to the durability and size improvements discussed above, many users prefer the aesthetics of folding designs over others. Despite the above improvements, the conventional folding mobile station design depicted in FIGS. 1A and 1B is still not optimal. For example, conventional folding mobile stations 100 use a cylindrical hinge assembly 175 similar to a standard door hinge, to bind the first functional component 101 to the second functional component 102. As illustrated in FIG. 1C, this hinge assembly 175 is relatively complex and more importantly, requires highly labor-intensive assembly operations and thus, is costly to manufacture.

In particular, conventional hinge assemblies 175 are comprised of hinge members 176, 177 and 181 that extend from the first functional component 101, and hinge members 178 and 179 that extend from the second functional component 102. These hinge members 175-179 and 181 are held together by a hinge pin 180 that extends through openings (not shown) formed in each hinge member. During assembly, the hinge pin 180 must be carefully inserted through the openings provided in the hinge members 175-179 and 181, and also must be threaded through a pre-assembled spring 182, a profile indent part (dynamic) 183, a profile indent part (static) 184 as shown in FIG. 1C. These latter components are provided to maintain the mobile station 100 in either an open or closed position as known to one of ordinary skill in the art. Finally, a flexible printed circuit or cable bundle 185 must be awkwardly wrapped around the pin 180 to ensure that the first functional component 101 is electrically connected to the second functional component 102.

As will be apparent to one of ordinary skill in the art, the complexity of the above hinge design results in cost-prohibitive and bulky hinge assemblies. For example, the above hinge assembly requires precision elements, high part counts, and relatively long assembly times that all add to the manufactured cost. In addition, the complex prior art hinge designs hinder the ability of designers to make stylish modifications. In light of the foregoing, it would be highly desirable to provide an improved hinge design for a foldable mobile station that is relatively simple to assemble and compliments the overall aesthetic appeal of the mobile station. Furthermore, it would be desirable to provide a hinge design that maintains the durability and size benefits realized by the development of modern foldable mobile stations.

BRIEF SUMMARY OF THE INVENTION

The present invention provides an improved hinge design for a mobile station, such as a mobile phone or other foldable electronic device, that simplifies hinge assembly and thus, provides a more cost-effective manufactured product. Moreover, the improved hinge design complements the aesthetic appeal of the foldable mobile station and results in less applied stress on various internal elements. Mobile stations and other foldable electronic devices include first and second functional components that are pivotally coupled together. In several embodiments of the present invention, the first and second functional components are mechanically coupled in foldable relation by a bi-stable member. The bi-stable member functions to bias the mobile station into a folded position and an open position.

In one embodiment, the bi-stable member comprises at least one foldable portion having a substantially flattened transverse cross-section in the folded position and a substantially curved transverse cross-section, such as a C-shaped transverse cross-section, in the open position. In another embodiment, the foldable portion generally includes opposed lateral edges and stiffening portions disposed adjacent thereto. A median region is defined between the stiffening portions such that the stiffening portions are configured substantially planar to the median region in the folded position, and substantially non-planar to the median region in the open position.

In one embodiment, the bi-stable member comprises a laminate structure having a resilient substrate layer comprised of a polymer laminate, a strip of mesh or spring metal, a fiber reinforced composite or some combination thereof, that is biased toward the open position. The laminate structure further includes a plastically deformable layer configured to oppose the bias of the resilient substrate layer in the folded position. Accordingly, the folded position and the open position are reversible and stable positions.

In other embodiments, the laminate structure of the bi-stable member comprises a plurality of pre-stressed elements disposed adjacent the plastically deformable layer, wherein the pre-stressed elements are under tension in the open position and further configured such that the tension is at least partially relieved in the folded position. In one embodiment, the plurality of pre-stressed elements are aligned substantially axially within the laminate structure.

In another embodiment, the laminate structure of the bi-stable member comprises a plurality of pre-stressed elements disposed adjacent the resilient substrate layer, wherein the pre-stressed elements are under tension in the folded position and further configured such that the tension is at least partially relieved in the open position. In one embodiment, the plurality of pre-stressed elements are aligned substantially transversely within the laminate structure.

According to one aspect of the present invention, a foldable device is provided comprising: a first functional component; a second functional component; a communication member for electrically connecting the first functional component to the second functional component; and a bi-stable member for biasing the first and second functional components into an open position and a folded position. The bi-stable member defines at least one foldable portion having a substantially flattened transverse cross-section in the folded position and a substantially C-shaped or curved transverse cross-section in the open position.

According to another embodiment, the present invention includes a method of manufacturing a mobile station comprising the steps of: providing a bi-stable member for biasing a mobile station between an open position and a folded position, the bi-stable member defining at least one foldable portion having a substantially flattened transverse cross-section in the folded position and a substantially C-shaped or curved transverse cross-section in the open position; coupling a first functional component to the foldable portion of the bi-stable member; and coupling a second functional component to the foldable portion of the bi-stable member. The method of producing a mobile station may further comprise the step of electrically connecting a communication member between the first functional component and the second functional component. In addition, the method includes the step of shielding the communication member in the open and closed positions.

These and other features, aspects, and advantages of embodiments of the present invention will become apparent with reference to the following description in conjunction with the accompanying drawings. It is to be understood however, that the drawings are designed solely for the purposes of illustration and not as a definition of the limits of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A, 1B, and 1C are views of one example of a conventional foldable mobile station (i.e., mobile phone) according to the known prior art; wherein

FIGS. 2, 2A and 2B are illustrations of an exemplary bi-stable structure according to the known prior art; wherein

FIGS. 3A, 3B, 3C are perspective views of a mobile station in accordance with one embodiment of the present invention; wherein

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The mobile station of the present invention uses bi-stable structures. These bi-stable structures comprise one or more extendable, coilable, members that can be advanced from a coiled or retracted state to an extended state. The simplest of the conventional bi-stable structures is the common steel tape measure. Advantageously, as is apparent in view of a tape measure, bi-stable structures may be advanced and recoiled from one state to the other and back a plurality of times. Suitable structures are disclosed in the following United States Patents issued to Daton-Lovett: U.S. Pat. No. 6,217,975 granted on Apr. 17, 2001 and U.S. Pat. No. 6,256,938 granted on Jul. 10, 2001; both incorporated herein by reference. Such bi-stable structures are available from Rolatube Technology Limited (United Kingdom) and from other suppliers.

Figures 2, 2A, 2B:
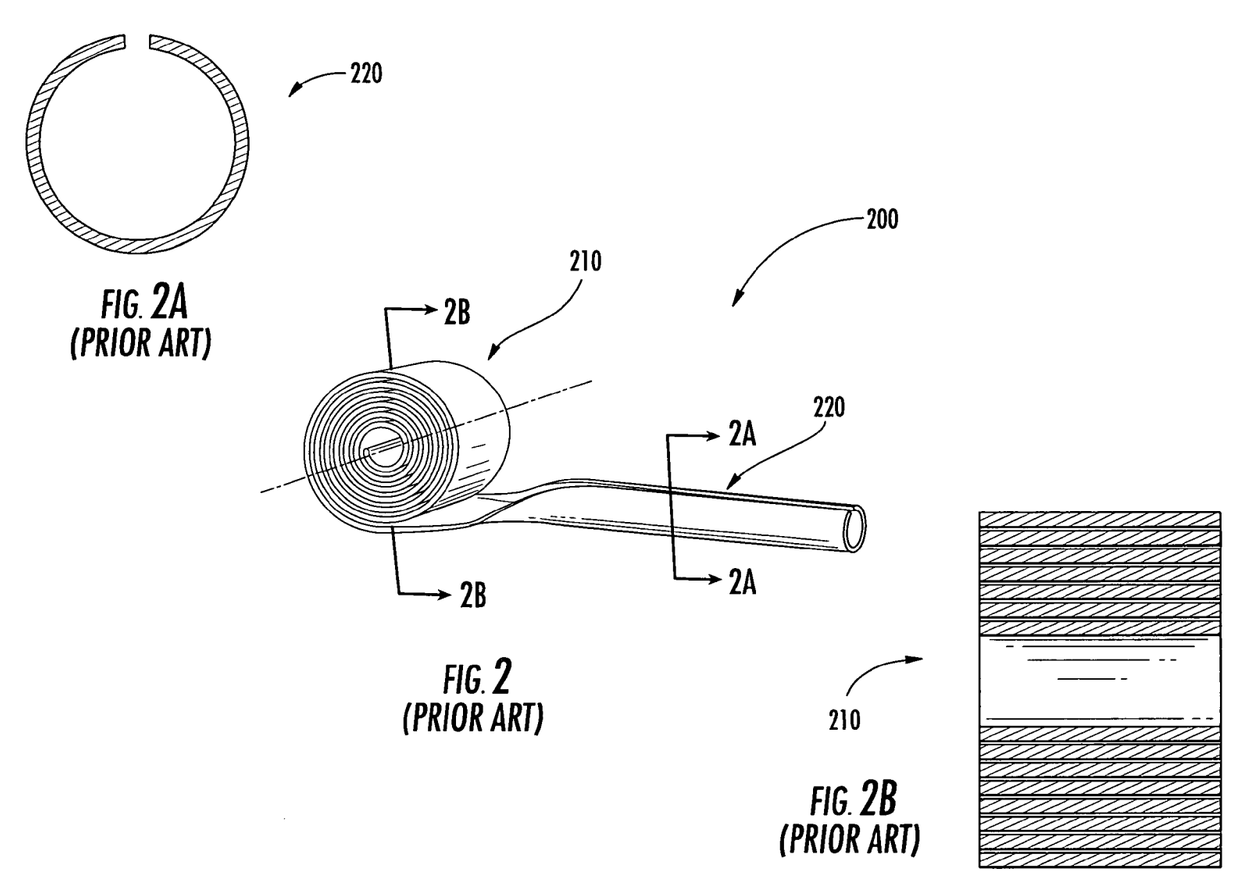
FIG. 2 is an isometric view of a known bi-stable structure.
FIG. 2A is a section view of the known bi-stable structure of FIG. 2, taken along section line 2A-2A.
FIG. 2B is a section view of the known bi-stable structure of FIG. 2, taken along section line 2B-2B.

FIG. 2 depicts one example of an extendable, coilable, bi-stable structure 200 in accordance with the known prior art. As used in the above referenced patents, the following specification and appended claims, the term "bi-stable" refers to materials or composites that are configurable or biased toward two stable shapes. In particular, conventional bi-stable structures 200 are comprised of materials that are biased toward an extended shape or state, and additional materials that are biased opposite to the first materials toward a coiled shape or state. The bi-stable structure 200 of FIG. 2 includes portions that are configured in each of the above-referenced states, i.e., a coiled portion 210 and an extended portion 220. In hopes of better defining these extended and coiled (or folded) positions, the following specification and appended claims refers to an axial direction that is oriented generally in the direction of extension, and alternatively, to a transverse direction that is substantially perpendicular to the axial direction.

In its extended state, a conventional bi-stable structure 200 has a curved, semi-circular, or circular transverse cross-section as illustrated in FIG. 2A. In its coiled state, a conventional bi-stable structure 200 has a substantially flattened transverse cross-section as illustrated in FIG. 2B. Although depicted in FIGS. 2 and 2A as having a circular cross-section, bi-stable structures 200 can alternatively have oval, curved, C-shaped or other cross-sectional configurations as known in the art. The differences in the transverse cross-sections of the two states allow a bi-stable structure to be coiled up or retracted into a much smaller volume than it could otherwise occupy in its extended state.

The bi-stable properties associated with the above geometric configuration may be enhanced through proper material selection. Known bi-stable structures 200 of the type illustrated in FIG. 2 are typically comprised of a resilient substrate layer, such as a spring metal in the case of a tape measure, which is biased toward the extended form (e.g., biased toward causing the member to have a curved cross-section). The resilient substrate can be laminated with a plastically deformable (i.e., capable of plastic deformation) layer that tends to bias the member towards the retracted form (e.g., having a flattened cross-section). Accordingly, in view of the tape measure example, a properly laminated tape measure (e.g., including a plastically deformable layer) could remain in either the extended or coiled forms without conventional latches or winding mechanisms. In such an application, the plastically deformable layer would oppose and possibly negate, the inherent bias of the tape measure that would otherwise return it to its extended form.

In several embodiments, the material properties of the resilient and plastically deformable layers may be selected or altered to enhance the performance of the bi-stable structure 200. For example, the modulus of elasticity of the bi-stable structure 200 can be modified across the length, width, and/or thickness of the structure 200 to achieve desired characteristics (e.g., end stop, torsional rigidity, force feedback curves, etc.) as known to one of ordinary skill in the art. Such design customization may be particularly useful for reducing the overall thickness (and weight) of the bi-stable structure 200 and further altering the application force necessary to extend or retract the bi-stable structure 200. In various other embodiments, the materials used to form bi-stable structures may be selected to possess other desired characteristics (e.g., high toughness, high thermal deformation resistance, etc.) as known in the art.

In one embodiment, bi-stable structures have resilient layers comprising one or more polymer composite layers having a thermoplastic matrix (e.g., polyethylene or polypropylene) with various configurations of pre-stressed elements attached to or embedded therein. For example, a composite layer of a bi-stable structure may include a thermoplastic layer having a plurality of pre-stressed glass, carbon, aramid or polymeric fibers disposed therein. These fibers can be oriented at different angles relative to one another in the plane of the bi-stable structure such that the structure is biased toward coiled and extended positions. For example, one set of fibers may be oriented generally axially and a second set of fibers may be oriented substantially transversely to produce a desired "bi-stable" effect. Various embodiments of the present invention will now be described with reference to certain types of bi-stable structures. It should be noted however, that the inventive concepts embodied by the present invention are not limited to the specific bi-stable structures expressly set out in the foregoing specification, and may in fact, incorporate any bi-stable structure that is commonly known in the art.

Figure 3A:
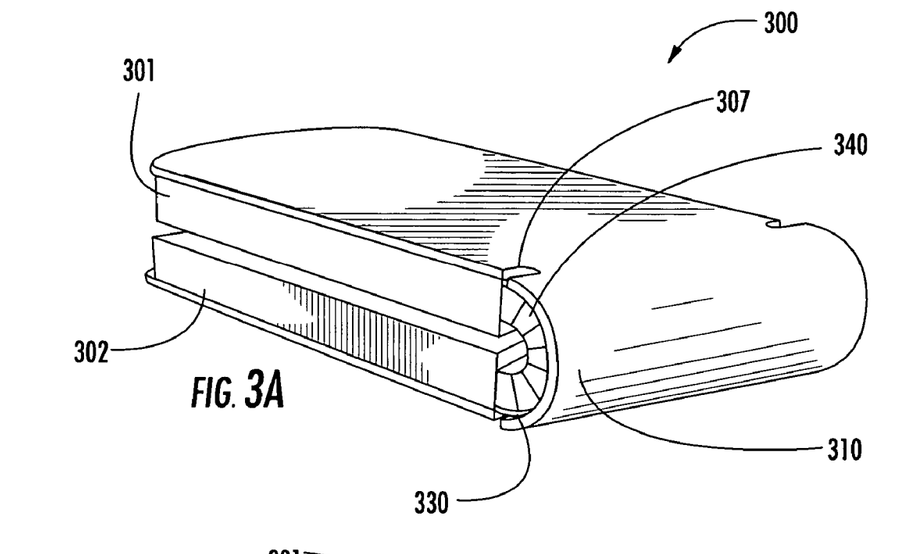
FIG. 3A depicts a mobile station in a folded position according to one embodiment.
Figure 3B:
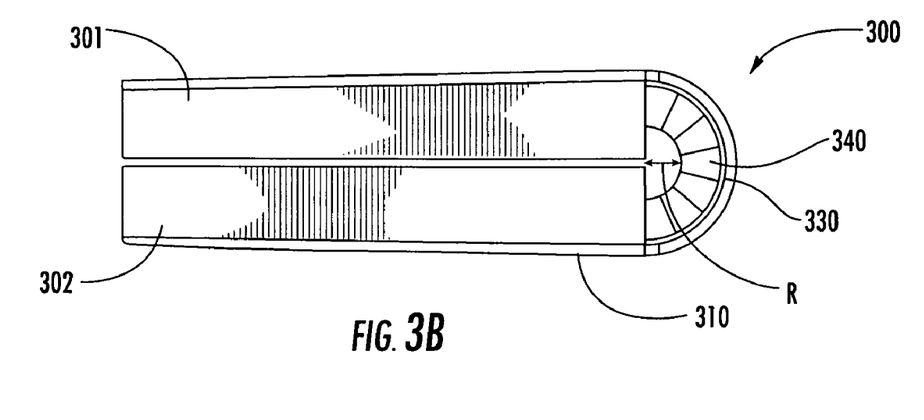
FIG. 3B depicts a side view of a mobile station according to one embodiment.
Figure 3C:
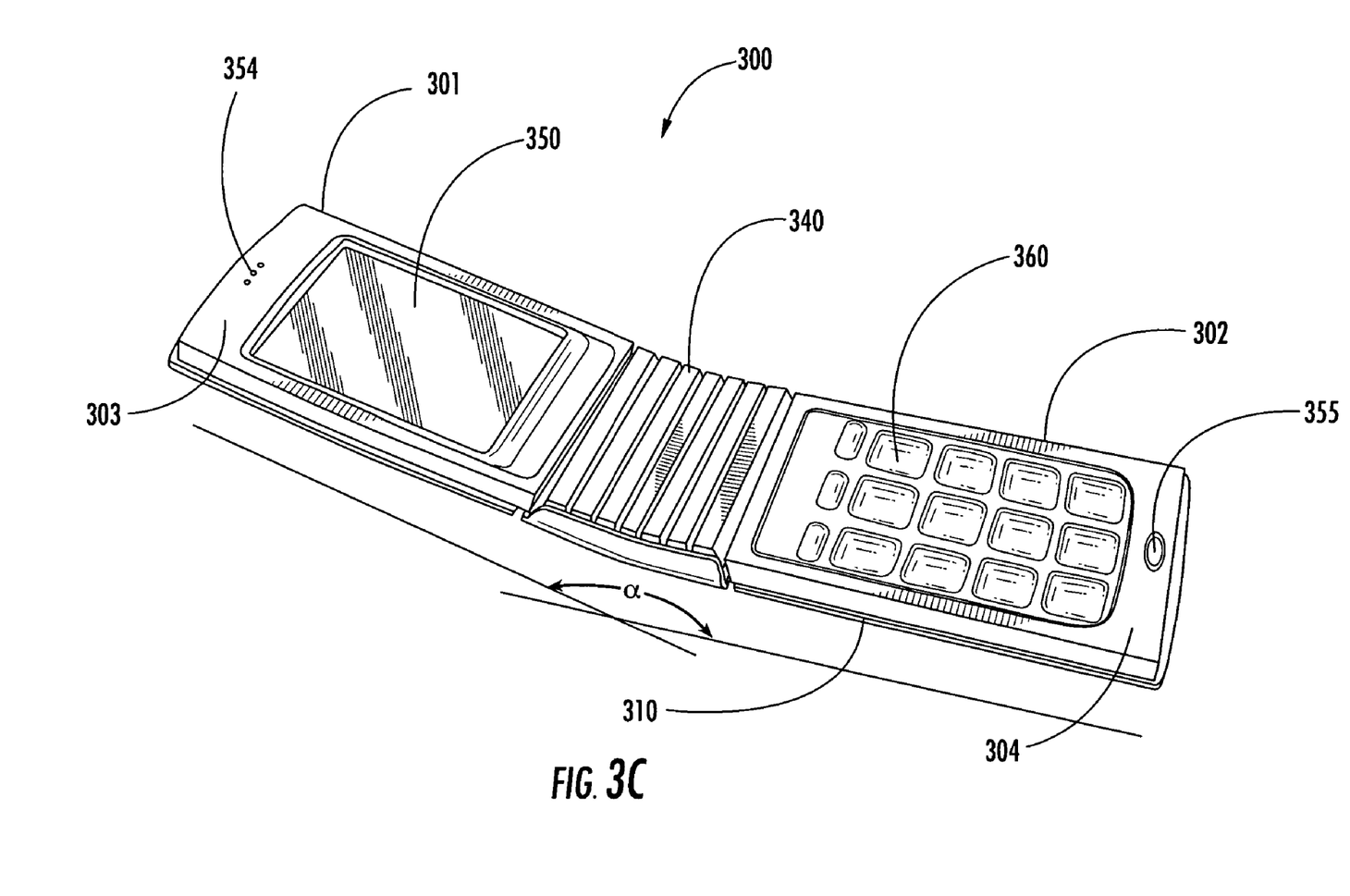
FIG. 3C depicts a mobile station in an open position according to one embodiment of the present invention.

FIGS. 3A-3C illustrate one application of the above technology to mobile station design in accordance with several embodiments of the present invention. For the purposes of the following specification and appended claims, the term "mobile station" refers to mobile phones, PDAs, pagers, calculators, laptop computers, or other similar foldable electronic devices as commonly known in the art. According to the depicted embodiment, a mobile station 300 (such as a mobile phone) is comprised of a first functional component 301 that is coupled in foldable relation to a second functional component 302. Accordingly, the mobile station 300 can be configured to achieve a folded position as shown in FIGS. 3A and 3B, and an open position as shown in FIG. 3C. In several embodiments of the present invention, the first functional component 301 is coupled to the second functional component 302 via a bi-stable member 310. The shape and functionality of the bi-stable member 310 according to several embodiments of the present invention will be described in detail below.

FIG. 3C illustrates an "opened" mobile station 300 in accordance with one embodiment of the present invention. In the open position, the first and second functional components 301, 302 combine to define an operation angle α. Depending on the particular application, this operation angle α may vary considerably. For example, in mobile phone applications the operation angle α may be between 150 and 180 degrees, while in other applications (e.g., laptop computers) the preferred operation angle α may be considerably less.

In the depicted embodiment, the first and second functional components 301, 302 of the mobile station 300 include respective first and second inner surfaces 303, 304. In various embodiments of the present invention, a plurality of relatively delicate operational elements (e.g., a display 350, a keypad 360, a speaker port 354, a microphone port 355, etc.) are disposed on or integral to the first and second inner surfaces 303, 304. Accordingly, as the first and second inner surfaces 303, 304 are disposed adjacent one another in the folded position (shown in FIGS. 3A, 3B) the plurality of operational elements are protected from potentially damaging impact or contact with foreign substances. Although FIG. 3C depicts certain operational elements adjacent either the first or second functional components 301, 302 it is important to note that the present invention is not limited to the depicted configuration, and in fact, the various elements may be disposed adjacent either the first or second functional components 301, 302 as known in the art.

As referenced above, according to one embodiment of the present invention, the first and second functional components 301, 302 are coupled in foldable relation to one another by a bi-stable member 310. Advantageously, various embodiments of the present invention use the inherent tendency of bi-stable structures to maintain either a coiled or extended state, as a means to bias a mobile station 300 toward either an open or folded state, respectively. In one embodiment, the bi-stable member 310 serves to bias the mobile station 300 toward either a folded position (as depicted in FIGS. 3A and 3B) or an open position (depicted in FIG. 3C). Accordingly, an opening force or a closing force must be applied by a user when respectively opening or closing the mobile station 300, thereby overcoming the inherent tendency of the bi-stable member 310 to remain in either the folded or open position. This functionality is particularly desirable to protect against inadvertent opening during periods of non-use, or inadvertent closing during periods of use.

In the depicted embodiment, the bi-stable member 310 also functions to enclose and protect the first and second functional components 301, 302 along with their respective operational elements (e.g., LCD display 350, keypad 360, etc.). In various other embodiments, however, this need not be the case as a bi-stable member could be provided within a more conventional housing or set of housings (not shown); wherein the bi-stable member performs the biasing function and the housing(s) perform the above protective enclosure function.

Figures 4, 4A:
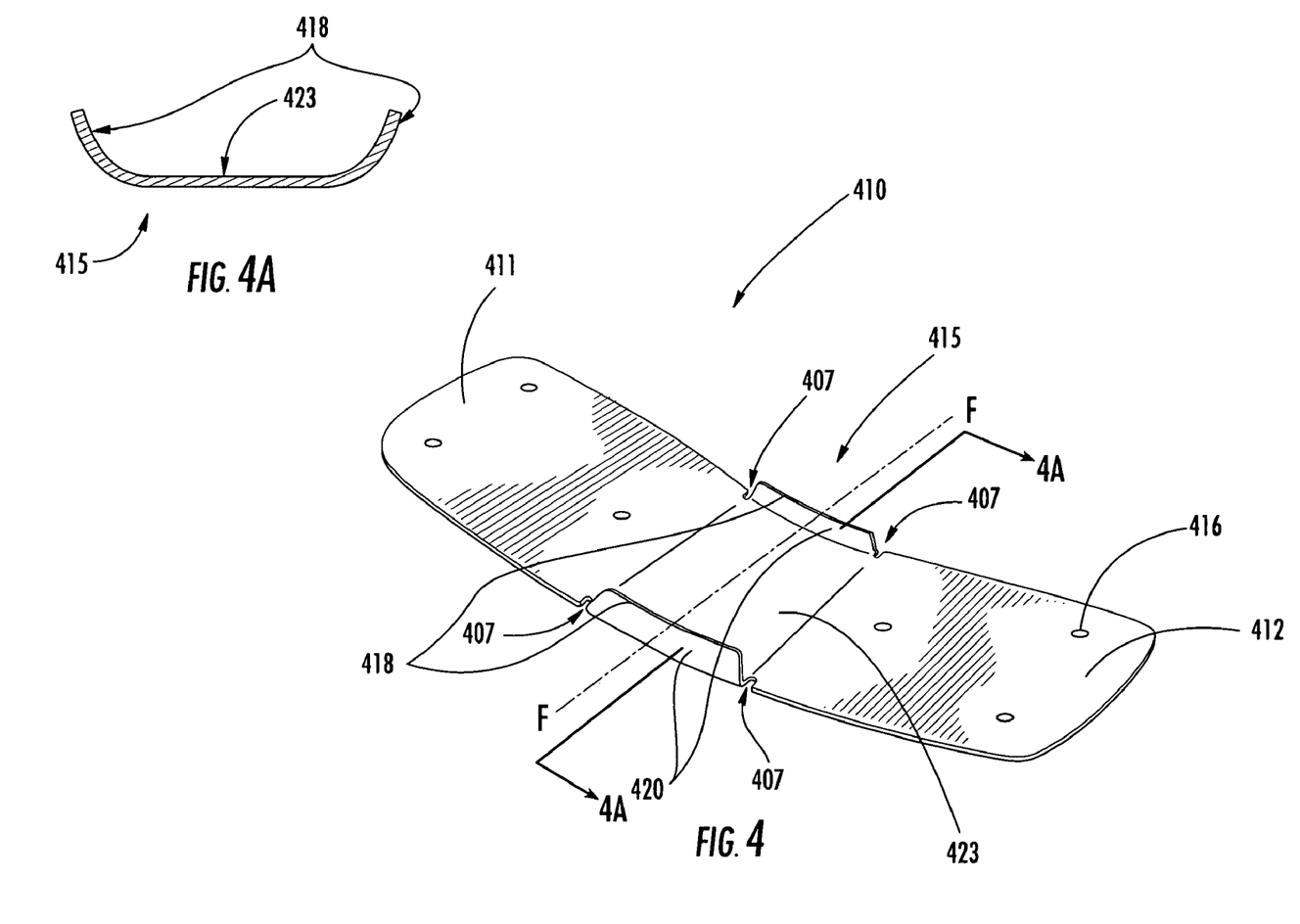
FIG. 4 illustrates a bi-stable member in an open position according to one embodiment of the present invention.
FIG. 4A is a section view of the bi-stable member of FIG. 4, taken along section line 4A-4A.
Figure 5:
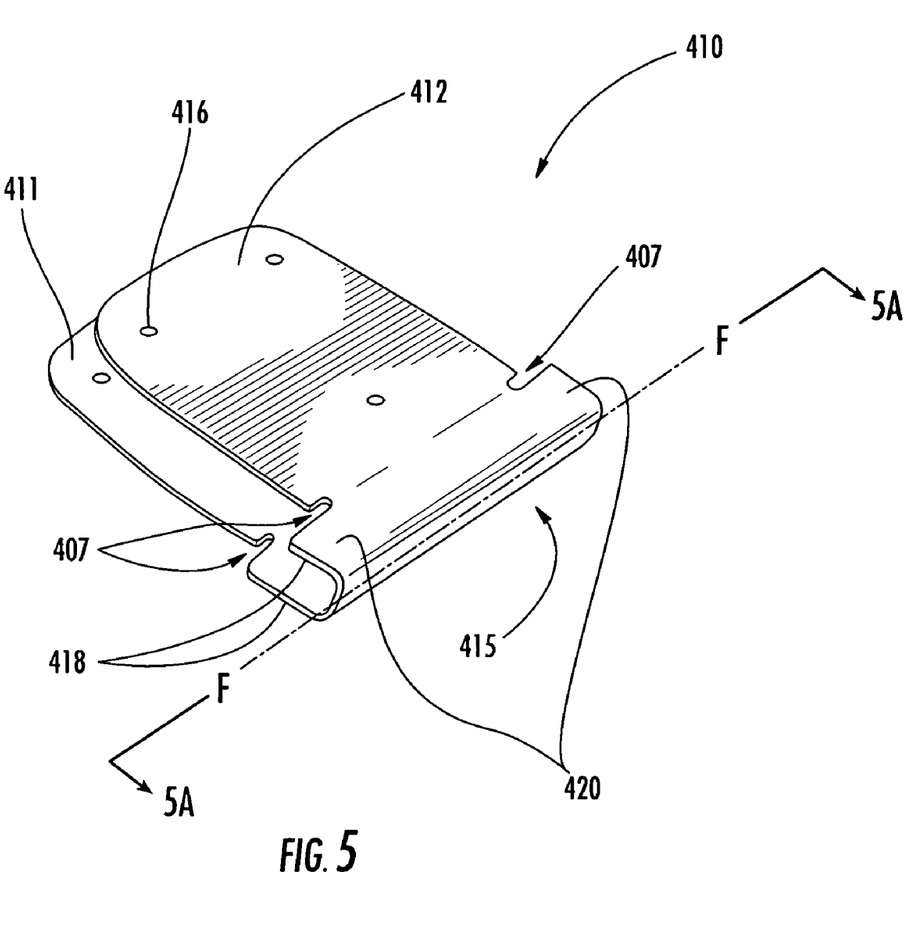
FIG. 5 illustrates a bi-stable member in a folded position according to one embodiment of the present invention.

FIGS. 4 and 5 depict a bi-stable member 410 according to various embodiments of the present invention. In particular, FIG. 4 depicts a bi-stable member 410 in an open position and FIG. 5 depicts a bi-stable member 410 in a folded position. According to one embodiment, the bi-stable member 410 comprises first and second parts 411, 412 that are axially spaced from one another by a foldable portion 415. The first and second parts 411, 412 are configured to support and be connected to the first and second functional components (as shown in FIGS. 3A-3C). When transitioning between open and folded positions the bi-stable member 410 can be folded adjacent a fold-axis F such that the second part 412 is positioned over the first part 411 as shown in FIG. 5. Alternatively, the bi-stable member 410 is readily reversible such that the first part 411 may be folded over the second part 412. In various embodiments of the present invention, the bi-stable member 410 may be completely comprised of bi-stable materials as referenced above, or alternatively, may be only partially comprised of such materials (e.g., one or more foldable portions) with the remainder being comprised of conventional materials. For example, in one embodiment, the first and second parts 411, 412 may be comprised of conventional materials while the foldable portion 415 is comprised of bi-stable materials.

Although depicted as folding into two substantially equal halves, a bi-stable member 410 according to the present invention is not limited to this configuration. In one embodiment, the fold-axis F may be non-centrally located within the foldable portion 415, thereby producing a first part 411 (or second part 412) that is larger than the opposed second part 412 (or first part 411). In another embodiment, the foldable portion 415 itself (and thus the fold-axis F) may not be centrally located as shown, thereby producing a similar effect wherein the first and second parts 411, 412 have different sizes. In another embodiment, multiple foldable portions 415 may be provided, such that a tri-fold (two foldable portions), quad-fold (three foldable portions) or other similar multiple-fold configuration is produced, as known to one of ordinary skill in the art.

Returning to the embodiment depicted in FIG. 4, the foldable portion 415 is bounded by opposed lateral edges 418. In one embodiment, stiffening portions 420 are formed adjacent the lateral edges 418 thereby defining a median region 423 therebetween. When configured in the open position, the stiffening members 420 are curved away from the median region 423 producing the substantially non-planar transverse cross-section illustrated in FIG. 4A. The stiffening members 420 function to stabilize the bi-stable member 410 against folding in unintended directions (e.g., in the direction opposite an intended folding direction) and further provide the curved transverse cross-section that is characteristic of a bi-stable material. Notably, the transverse cross-section (defined by the stiffening members 420 and median region 423) of the foldable portion 415 may be substantially C-shaped as shown, generally curved, or alternatively may be semi-circular, or possibly circular as known to one of ordinary skill in the art.

Figure 5A:
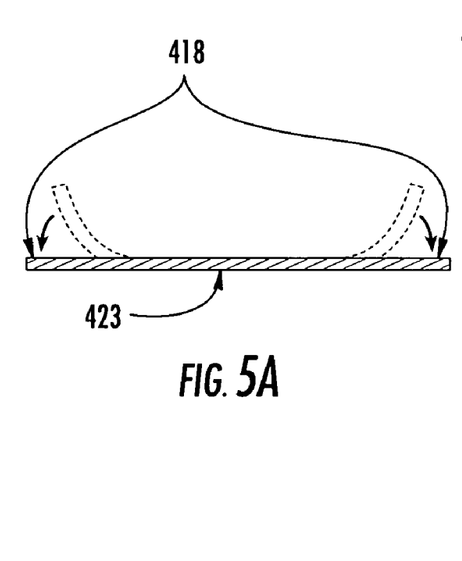
FIG. 5A is a section view of the bi-stable member of FIG. 5, taken along section line 5A-5A.

When positioned in the folded position (as shown in FIG. 5), the bi-stable materials that comprise the foldable portion 415 cause the stiffening members 420 to rotate outwardly such that a substantially planar or flattened transverse cross-section (defined between the stiffening members 420 and median region 423) is produced as shown in FIG. 5A. In one embodiment, the stiffening members 420 may be axially bounded by a plurality of notches 407 to isolate the first and second parts 411, 412, thereby reducing the stress and curvature applied to the first and second parts 411, 412, as the bi-stable member 410 transitions between open and folded positions. In other embodiments, these notches 407 may be optionally omitted such that the curvature of the stiffening members 420 extends axially onto the first and second parts and is configured to protect at least a portion of the first and second functional components (not shown).

Figures 6, 6A:
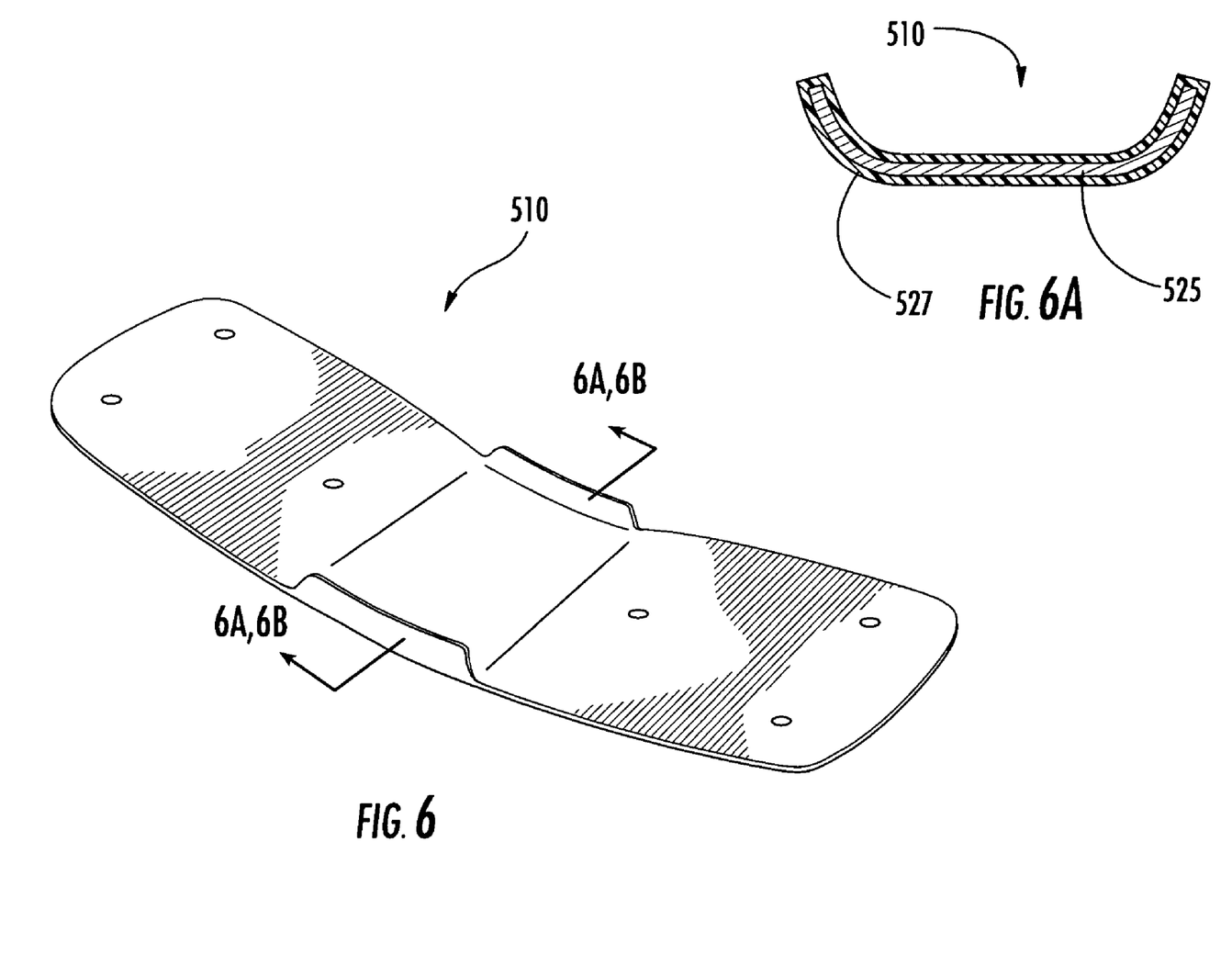
FIG. 6 illustrates a bi-stable member according to two additional embodiments of the present invention.
FIG. 6A is a section view of the bi-stable member of FIG. 6 according to one embodiment, taken along section line 6AB-6AB.
Figure 6B:
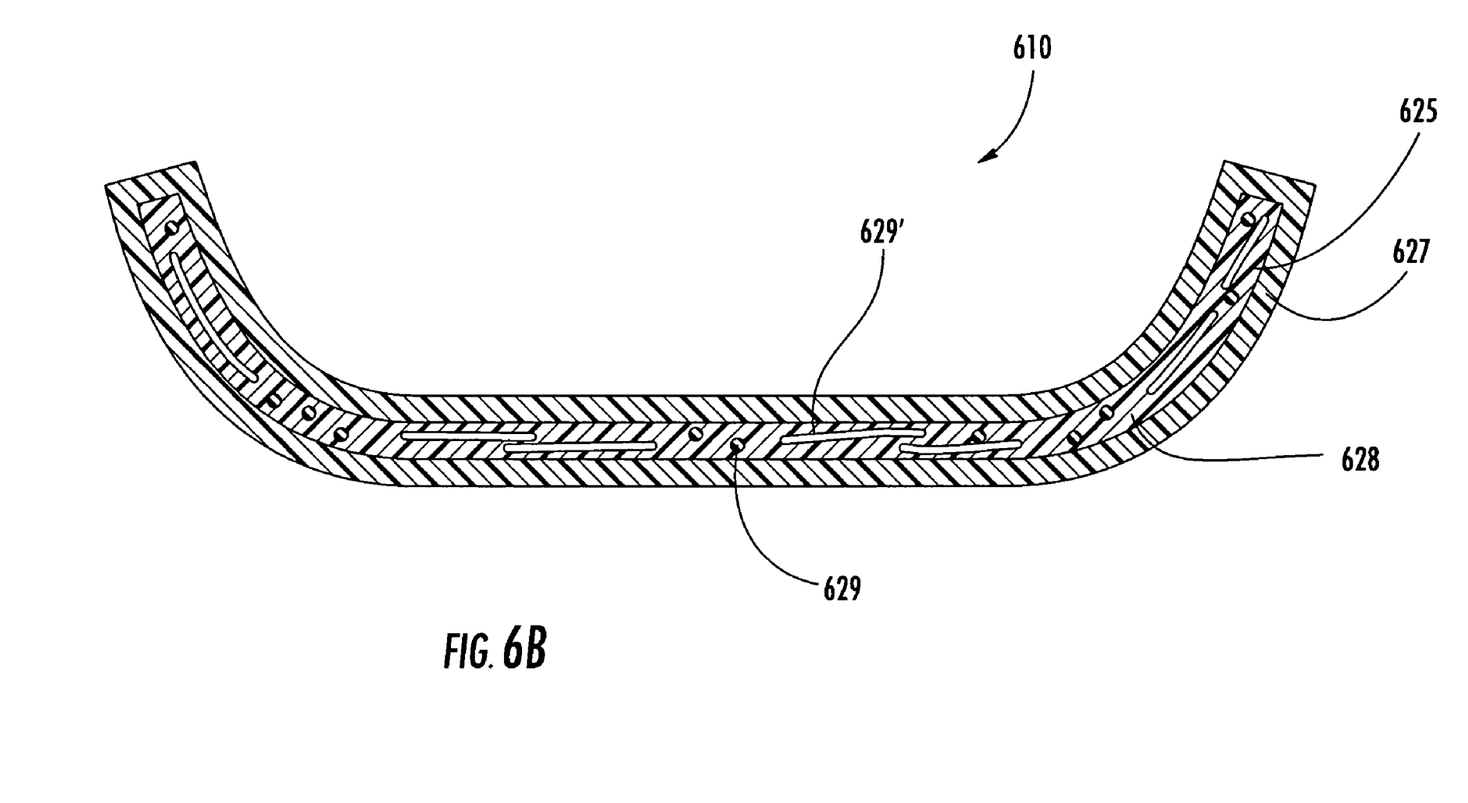
FIG. 6B is a section view of the bi-stable member of FIG. 6 according to another embodiment, also taken along section line 6AB-6AB.

As referenced above and illustrated by FIGS. 6, 6A and 6B, the bi-stable member 510, 610 (or a portion thereof) according to various embodiments may be comprised of a variety of bi-stable materials. In one embodiment, the bi-stable member 510 is comprised of a resilient substrate layer 525 that is biased toward an open position (e.g., curved transverse cross-section) and a plastically deformable layer 527 that is configured to oppose the bias of the resilient substrate layer 525, to encourage a substantially flattened transverse cross-section (e.g., in the folded position. In various embodiments, the resilient substrate 525 may be comprised of a pre-stressed polymer material (such as the composite structures described below), a spring steel or other similar resilient metals, or a non-ferrous alloy such as beryllium copper (although the latter material is generally not preferred due to environmental concerns). For example, in one embodiment, the resilient substrate 525 may include one or more layers of spring steel having a thickness approximating 0.05-0.5 mm that are spaced apart by a soft resin layer. In other embodiments, the resilient substrate 525 (or a portion thereof) may be comprised of electrically sensitive materials such as polypyrrole materials. In the latter embodiment, the resilient layer 525 may be biased toward either the open or folded positions by the application of an electric current or field as known to one of ordinary skill in the art.

In several embodiments, the plastically deformable layer 527 may be comprised of any polymer or other material that is capable of plastic deformation at ambient temperatures. Suitable materials may include polypropylene, polyethylene, polyamides (e.g., nylon), polyurethane, thermo plastic elastomers or other similar materials. Alternatively, in other embodiments, a thermo setting material such as rubber or silicone may be used.

As will be appreciated by one of ordinary skill in the art, when the bi-stable member 510 is moved from the open to the folded position the plastically deformable layer 527 undergoes plastic deformation such that it becomes biased in favor of the folded position. Accordingly, in the folded position the plastically deformable layer 527 opposes, or even negates, the potential energy that has been stored in the resilient substrate 525 during folding. This causes the bi-stable member 510 to have a relatively stable folded position. In various embodiments, additional latches, locks or other guiding surfaces (not shown) may be provided to further stabilize the folded position. In various other embodiments, strengthening ribs, supports, or locking mechanisms (not shown) may be provided to stabilize a desired open position as known in the art.

In another embodiment, as shown in FIG. 6B, the bi-stable member 610 (or a portion thereof) may be comprised of at least one composite layer 625 comprising a thermoplastic resin 628, such as polypropylene, polyethylene, polyamide, polyurethane, etc., and a plurality of pre-stressed elements 629, 629' formed within or laminated adjacent the resin 628. The resin (or matrix) 628 suspends the pre-stressed elements 629, 629' in a given position relative to one another.

The pre-stressed elements 629, 629' may include fibers of pre-stressed glass, carbon, aramid, graphite, rubber, metal or other similar materials as known in the art. In various embodiments, the pre-stressed elements 629, 629' are configured to produce an elastic resilient layer having specific material properties across various axes. In one embodiment, the composite layer 625 may include a plurality of axially-aligned pre-stressed elements 629 that are configured under tension when the bi-stable member 610 is in the open position, and further configured such that the tension is at least partially relieved when the bi-stable member 610 is in the folded position. In one embodiment, the composite layer 625 may include a plurality of transversely-aligned pre-stressed elements 629' that are under tension in the folded position, and further configured such that the tension is at least partially relieved in the open position. Further, it is not necessary that such fibers be oriented at 90 degree angles from one another. In various embodiments, the substantially axial pre-stressed elements 629 and the substantially transverse pre-stressed elements 629' may be provided in a single composite layer 625 as shown, or alternatively, may be provided in multiple composite layers (not shown) as known in the art. In multiple layer applications, the resin or matrix of adjacent layers may have differing elastic stiffnesses to achieve specific material properties as known in the art. Further, depending on the application, such layers may be separated by filler layers (not shown) having no pre-stressed elements. Finally, one or more plastically deformable layers 627 may be laminated to the one or more composite layers 625 to oppose or negate the respective biases of the pre-stressed elements 629, 629' provided therein. Alternatively, in other embodiments, the plastically deformable layers 627 may be omitted by merely selecting a resin 628 or filler material that is capable of plastic deformation at ambient temperatures as known in the art.

Figure 7:
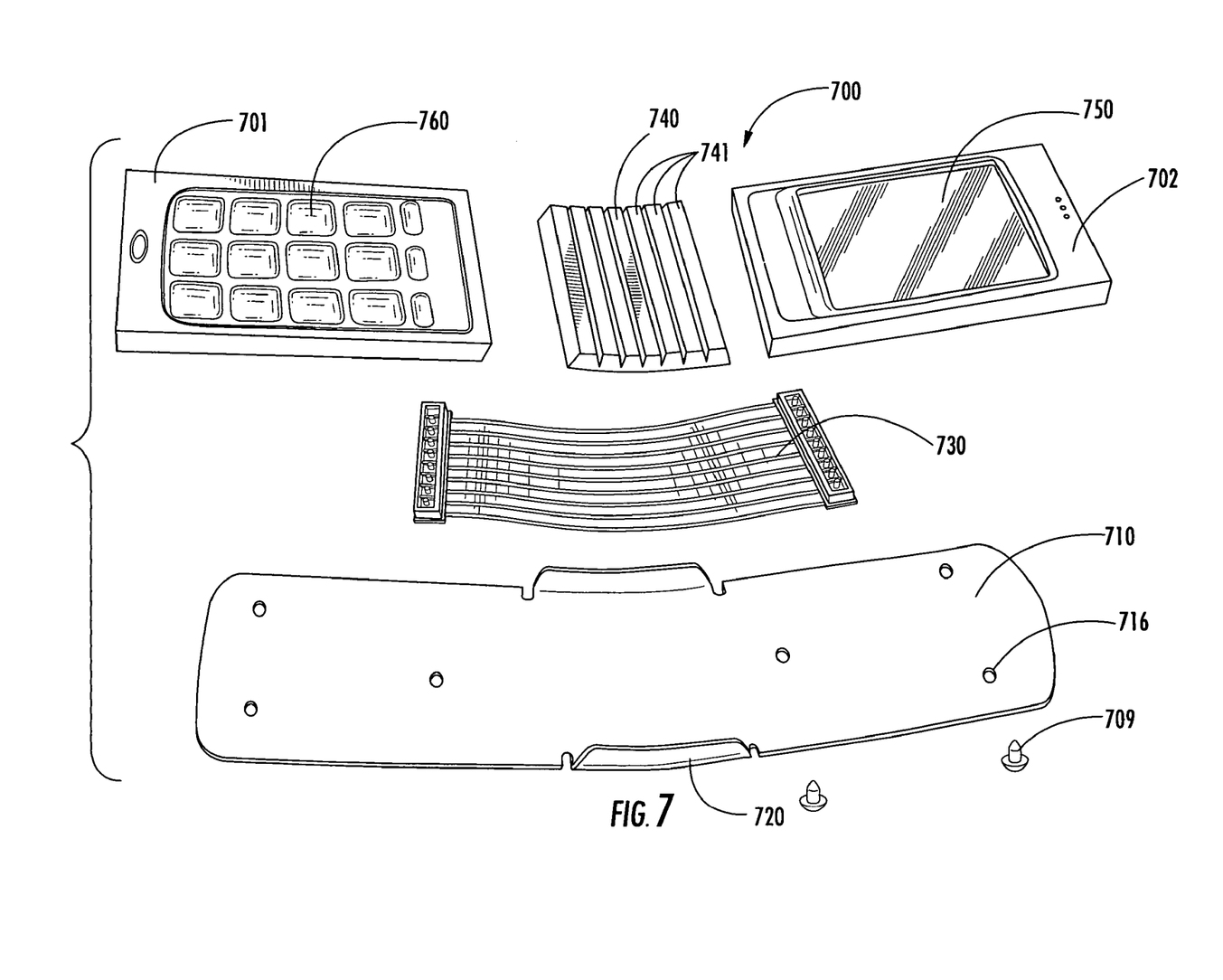
FIG. 7 is an exploded view of mobile station in accordance with one embodiment of the present invention.

FIG. 7 provides an exploded view of a mobile station 700 in accordance with one embodiment of the present invention. According to the depicted embodiment, the mobile station 700 includes a bi-stable member 710 for supporting a first functional component 701 and a second functional component 702. The first and second functional components 701, 702 may be coupled to the bi-stable member 710 via various fasteners as known in the art. For example, screws 709 may be set into the first and second functional components 701, 702 through holes 716 provided in the bi-stable member 710 as shown. Alternatively, other fasteners such as adhesives, rivets, clips, studs, (not shown) and the like may be used.

In one embodiment, the first functional component 701 is electrically connected to the second functional component 702 by a communication member 730. In various embodiments, the communication member 730 electrically connects the first functional component 701 and the second functional component 702. Accordingly, the communication member 730 may be comprised of a flexible electrical connector (as shown) as commonly known in the art. In other embodiments, however, the communication member 730 may take on other specific tasks, such as providing a receiving or transmitting antenna or facilitating various internal electronic circuitry. In these embodiments, the communication member 730 may comprise conductive leads printed on a Flexible Printed Circuit (FPC), or alternatively, may include conductors or other devices for optical transmission, inductive near field transmission or short range transmissions such as Bluetooth, RFID, 802.11 and the like.

In the depicted embodiment, a protective member 740 is provided to shield the communication member 730 against cuts, wear, hits, sharp bends etc. The protective member 740 may comprise a variety of shapes and may be composed of a variety of materials. In one embodiment, as illustrated in FIG. 7, the protective member 740 is comprised of a rigid polymer (e.g., polypropylene, polyurethane, polyethylene, ABS, etc.) that is divided into a plurality of inter-connected wedge-shaped segments 741 such that the mobile station 700 is forced to maintain a fold radius R (as shown in FIG. 3B) that will not damage the communication member 740. For example, in one embodiment, the protective member 740 is designed to maintain a fold radius R of between 8-10 mm. Alternatively, in the prior art designs illustrated in FIGS. 1A-1C, the electrical cable bundle 185 is tightly wound about a narrow pin 180 and threaded into a narrow channel (on the order of 6 mm). Accordingly, prior art electrical cable bundles 185 are prone to stress, wear and potential breaking.

In other embodiments, the protective member 740 may be comprised of an air filled molded membrane (not shown) that is made from silicone, rubber, a thermoplastic elastomer, a thermoplastic urethane or some combination thereof. In other embodiments, the protective member 740 may be comprised of an open celled foam (not shown) made from a plastic or other similar materials. As is apparent to one of ordinary skill in the art, the precise configuration of the protective member 740 may vary from application to application depending on the selected materials and available space.

As will be apparent to one of ordinary skill in the art, the present invention results in a number of benefits. For example, the present invention significantly limits manufacturing costs by enabling z-axis assembly, wherein the x-y plane is defined along the plane of the bi-stable member as shown in FIG. 7. According to various embodiments of the present invention, the components that combine to form a mobile station 700 (e.g., a bi-stable member 710, a communication member 730, a protective member 740, first and second functional components 701, 702, etc.) may simply be stacked one atop the next during assembly. This relatively simply process stands in sharp contrast to the intricate aligning, threading, and cable bundle wrapping operations required to produce hinge assemblies according to the known prior art. Accordingly, streamlined automated manufacturing processes can be employed to provide a more cost-effective manufactured product. In addition, the above-referenced embodiments of the present invention reduce the number and complexity of the necessary hinge components, thus, further reducing cost. Finally, various embodiments of the present invention that incorporate bi-stable type hinges provide a streamlined, unique and aesthetically pleasing hinge appearance rather than the relatively bulky design of the known prior art.

The embodiments are illustrative of the mechanical and electrical interconnection of the parts of the electronic devices. Details of the electronic features of the electronic devices are not needed for one skilled in the art to understand the invention as described and shown. For example, there may be an interface 708 used to connect power and interface cables, a keypad 760 or other such user interface, or a display 750 for the presentation of information.

Figures 8, 8A:
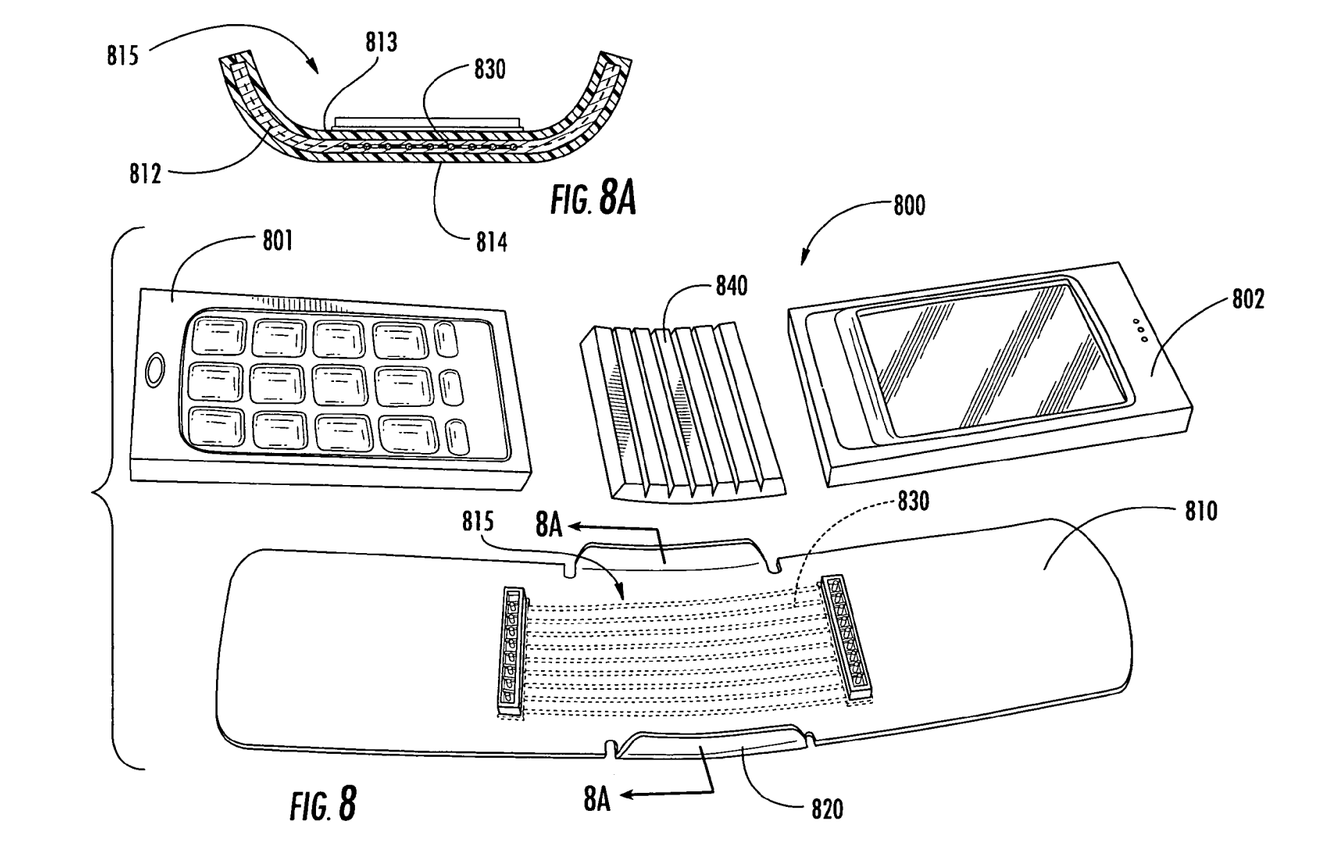
FIG. 8 is an exploded view of a mobile station in accordance with another embodiment of the present invention.
FIG. 8A is a section view of the mobile station of FIG. 8, taken along section line 8A-8A.

In still other embodiments as illustrated in FIGS. 8 and 8A, the protective member may be omitted entirely as the communication member 830 (e.g., a flexible printed circuit) is disposed within or integral to the foldable portion 815 of the bi-stable member 810. Accordingly, the bi-stable member 810 at least partially encloses the communication member 830 and thereby protects the member 830 from contact with objects that might cause damage. In one embodiment, the communication member 830 is disposed adjacent a "neutral bending line" that is inherent within bendable members (e.g., the foldable portion 815 of the bi-stable member 810) as known in the art. As illustrated in the section view provided by FIG. 8A, the foldable portion 815 of the bi-stable member 810 includes a first surface 813 and a second surface 814. The "neutral bending line" 812 is a theoretical axis or plane defined within the foldable portion 815 between the first and second surfaces 813, 814 as referenced above and known in the art. The neutral bending line represents that portion of the bendable material that is not stretched or compressed as the bi-stable member 810 is folded. Accordingly, by placing the communication member 830 substantially adjacent the neutral bending line 812 of the foldable portion 815 of the bi-stable member 810 as shown, stretching or compressing of the communication member 830 may be reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A bi-stable member for a mobile station, comprising:
a first part;
a second part; and
at least one foldable portion comprised of bi-stable materials configured to foldably couple said first part to said second part, said at least one foldable portion is further configured to bias a mobile station between a folded position and an open position, and said at least one foldable portion includes a substantially flattened transverse cross-section in said folded position and a substantially C-shaped transverse cross-section along a width of said foldable portion in said open position.

2. The bi-stable member of claim 1, wherein said foldable portion of said bi-stable member further comprises:
opposed lateral edges and stiffening portions disposed adjacent thereto,
a median region defined between said stiffening portions,
wherein said stiffening portions are configured substantially planar with said median region in said folded position and configured substantially non-planar with said median region in said open position.

3. The bi-stable member of claim 1, wherein said foldable portion of said bi-stable member further comprises a laminate structure including:
a resilient substrate layer that is biased toward said open position; and
a plastically deformable layer configured to oppose the bias of said resilient substrate layer in said folded position;
wherein said folded position and said open position are reversible and stable positions.

4. The bi-stable member of claim 3, wherein:
said plastically deformable layer comprises a polymer.

5. The bi-stable member of claim 3, wherein:
said resilient substrate layer comprises a strip of metal.

6. The bi-stable member of claim 3, wherein said laminate structure further comprises:
a plurality of pre-stressed elements disposed adjacent said plastically deformable layer, wherein said pre-stressed elements are under tension in said open position and the tension is at least partially relieved in said folded position.

7. The bi-stable member of claim 6, wherein:
said plurality of pre-stressed elements are aligned substantially axially in said laminate structure.

8. The bi-stable member of claim 3, wherein said laminate structure further comprises:
a plurality of pre-stressed elements disposed adjacent said resilient substrate layer, wherein said pre-stressed elements are under tension in said folded position and the tension is at least partially relieved in said open position.

9. The bi-stable member of claim 8, wherein:
said plurality of pre-stressed elements are aligned substantially transversely in said laminate structure.

10. The bi-stable member of claim 1, further comprising:
a first functional component coupled to said first part,
a second functional component coupled to said second part, such that said first and second functional components are foldably coupled together by said at least one foldable portion, and
a communication member disposed adjacent said at least one foldable portion for electrically connecting said first functional component to said second functional component.

11. The bi-stable member of claim 10, wherein:
said first functional component is positioned substantially adjacent to said second functional component in said folded position.

12. The bi-stable member of claim 10, wherein:
said first functional component is configured relative to said second function element to define an operating angle in said open position, and
wherein said operating angle is substantially between 90 to 180 degrees.

13. The bi-stable member of claim 10, wherein:
said first functional component is configured relative to said second function element to define an operating angle in said open position, and
wherein said operating angle is substantially between 150 to 180 degrees.

14. The bi-stable member of claim 10, further comprising:
a protective member disposed between said first functional component and said second functional component for protecting said communication member in said open position.

15. The bi-stable member of claim 14, wherein:
said protective member defines a maximum operating angle.

16. The bi-stable member of claim 10, further comprising:
a protective member disposed between said first functional component and said second functional component for protecting said communication member in said folded position.

17. The bi-stable member of claim 14, wherein:
said protective member defines a minimum fold radius.

18. A foldable device comprising:
a first functional component;
a second functional component;
a communication member for electrically connecting said first functional component to said second functional component; and
a bi-stable member for biasing said first and second functional components into an open position and a folded position, said bi-stable member defining at least one foldable portion having a substantially flattened cross-section in said folded position and a substantially curved transverse cross-section along a width of said foldable portion in said open position.

19. The foldable device of claim 18, wherein:
said foldable portion of said bi-stable member comprises a strip of resilient metal.

20. The foldable device of claim 18, wherein:
said communication member further comprises an antenna.

21. The foldable device of claim 18, wherein:
said communication member is disposed adjacent said bi-stable member.

22. The foldable device of claim 18, wherein:
said communication member is at least partially enclosed within said bi-stable member.

23. The foldable device of claim 18, wherein:
said communication member is at least partially enclosed within said foldable portion of said bi-stable member.

24. The foldable device of claim 23, wherein:
said communication member is positioned adjacent a neutral bending line defined within said foldable portion of said bi-stable member.

25. The foldable device of claim 18, wherein:
said first functional component is positioned substantially adjacent to said second functional component in said folded position.

26. The foldable device of claim 18, wherein:
said first functional component is configured relative to said second functional element to define an operating angle in said open position, and
wherein said operating angle is substantially between 90 to 180 degrees.

27. The foldable device of claim 26, wherein:
said operating angle is substantially between 150 to 180 degrees.

28. The foldable device of claim 18, further comprising:
a protective member disposed between said first functional component and said second functional component for protecting said communication member in said open position.

29. The foldable device of claim 28, wherein:
said protective member defines a maximum operating angle.

30. The foldable device of claim 18, further comprising:
a protective member disposed between said first functional component and said second functional component for shielding said communication member in said folded position.

31. The foldable device of claim 30, wherein:
said protective member defines a minimum fold radius.

32. A method of manufacturing a mobile station comprising the steps of:
providing a bi-stable member for biasing said mobile station between an open position and a folded position, said bi-stable member defining at least one foldable portion having a substantially flattened transverse cross-section in said folded position and a substantially C-shaped transverse cross-section along a width of said foldable portion in said open position;
coupling a first functional component to said foldable portion of said bi-stable member; and
coupling a second functional component to said foldable portion of said bi-stable member.

33. The method of manufacturing a mobile station of claim 32, further comprising the steps of:
electrically connecting a communication member between said first functional component and said second functional component.

34. The method of manufacturing a mobile station of claim 33, further comprising the steps of:
shielding said communication member in said open and closed positions with a protective member.

* * * * *